3,094,567
CHLORINATION OF PROPYNES
Charles M. Eaker, St. Albans, and George A. Saul, Nitro, W. Va., assignors to Monsanto Chemical Company, St. Louis, Mo., a corporation of Delaware
No Drawing. Filed Feb. 25, 1960, Ser. No. 10,874
4 Claims. (Cl. 260—654)

The present invention relates to the preparation of chloro substituted propenes containing chlorine on unsaturated carbon.

Chloroolefines comprising vinyl type chlorine are normally made by dehydrohalogenation of saturated chlorides. Because of the ease with which saturated chlorides form in the acetylene series, direct preparation of chloroolefines has not been considered feasible. For example, acetylene dichloride or sym. dichloroethylene is prepared most conveniently by starting with acetylene-tetrachloride and removing two chlorine atoms. Polymerization, decomposition and sudden explosions have been reported from treating acetylene compounds with chlorinating agents.

It has now been found that propynes combine smoothly with elemental chlorine to provide via addition reaction, a direct route to chloropropenes. The reaction takes place in liquid phase at temperatures of about 5–55° C. but preferably 10–30° C. At the lower temperatures the reaction is quite slow and care should be taken not to build up a dangerous concentration of unreacted chlorine leading to sudden uncontrollable reaction. In the chlorination of propargyl chloride the presence of chlorine can be readily detected by its characteristic green color which color serves as a convenient end point of the reaction. Propargyl chloride is a good solvent for chlorine so that chlorine absorption is not a reliable reaction indicator. Organic solvents can be used as desired but are unnecessary. Examples comprise acetic acid, propionic acid, decahydronaphthalene, nitrobenzene, orthodichlorobenzene, chloronitrobenzene and dichloroacetic acid. Similarly, chlorination catalysts may be used, as for example sulfuric acid, N-chlorosuccinimide, sulfur, iodine, $AlCl_3$, $BF_3$, $FeCl_3$, but these have contributed so little benefit as to be without practical consequence. The chlorine is preferably fed below the surface of the reaction mixture but feeding above the surface is feasible.

The following procedure is typical of the invention: Into a blackened flask fitted with chlorine feed line and reflux condenser was charged 100 grams (1.33 moles) of propargyl chloride. Subsurface feeding chlorine was started with the propargyl chloride at 25° C. The heat of reaction caused the temperature to rise to 30° C. within a few minutes but the reaction mixture was immediately cooled to 15° C. and kept at 15–20° C. throughout the rest of the run. The chlorine was fed in over a period of approximately four hours. When the chlorine feed was cut off the weight gain was 77.7 grams. The reaction mixture was washed with 200 ml. of water and then fractionated. The 1,2,3-trichloropropene fraction distilled at 75–100° C. under 100 mm. pressure. It weighed 93 grams of which approximately 79% was the trans isomer, 17% the cis isomer and the remainder made up of small amounts of 1,1,2,2,3-pentachloropropane and low boiling components. There was recovered 0.33 mole of propargyl chloride.

A run carried out with stronger cooling gave essentially the same yield but required eight hours to feed the chlorine. The reaction was carried out at 10–20° C. by intermittently cooling to 10° C. and allowing the heat of reaction to take the temperature up to about 20° C. Occasionally, higher peak temperatures were encountered before cooling became effective. There was recovered 0.28 mole of unreacted propargyl chloride. The trichloropropene fraction weighed 94 grams of which 79.7% was the trans isomer, 18.9% the cis isomer and the residue low boiling components. No pentachloropropane was detected.

Dehydrochlorination of tetrachloropropane yields a mixture of approximately equal parts cis- and trans-1,2,3-trichloropropene. For use as an intermediate the high proportion of trans isomer produced by the present invention is significant because it is distinctly more reactive. The allylic chlorine is removed more readily than from the cis isomer in displacement reactions. Consequently the 4:1 trans-cis isomer ratio is advantageous. Other substituted propynes as for example propargyl alcohol and propargyl bromide may be substituted for propargyl chloride.

As illustrative of reactions with propargyl bromide, the blackened reaction vessel described above was charged with 119 grams of propargyl bromide. Chlorine feed was started with the charge at 26° C. The heat of reaction took the temperature up to 35° C. at which point further temperature rise was checked by cooling and kept at 35–37° C. throughout the rest of the run. Chlorine was fed in over a period of approximately 140 minutes. When discontinued the gain in weight was approximately 67 grams. The reaction mixture was washed once with 200 ml. of water and distilled. The 1-bromo-2,3-dichloro-2-propene fraction distilled at 73–118° C. at 100 mm. and weighed 100 grams.

Since the reactions are strongly exothermic, heating is not necessary once reaction is initiated. To initiate reaction chlorine may be pre-heated and hot chlorine fed into cold propargyl chloride. Another expedient is to feed only a small amount of chlorine into cold propargyl chloride or solution thereof, as for example a chloroform or carbon tetrachloride solution, and allow the mixture to stand. After reaction is initiated, the feed of chlorine may be resumed. The formation of pentachloropropane may be reduced still further by increasing the excess of propargyl chloride. For example, charging 200 instead of 100 grams propargyl chloride as described and reacting with 102.6 grams chlorine at 20–25° C. reduced pentachloropropane from about 20% to 7% of the propargyl chloride undergoing reaction.

It is intended to cover all changes and modifications of the examples of the invention herein chosen for purposes of disclosure which do not constitute departures from the spirit and scope of the invention.

What is claimed is:
1. The process which comprises introducing from about .54 to .95 mole proportion of gaseous elemental $Cl_2$ into one mole proportion of a member of the group consisting of propargyl chloride and propargyl bromide in liquid phase at 5–55° C. and isolating trihalogenated olefinic unsaturated product as the predominant product.
2. The process of claim 1 in which the reaction is carried out at 10–30° C.

3. The process which comprises introducing from about .54 to .95 mole proportion of gaseous elemental $Cl_2$ into one mole proportion of propargyl chloride in liquid phase at 5–55° C. and isolating 1,2,3-trichloropropene as the predominant product.

4. The process which comprises introducing from about .54 to .95 mole proportion of gaseous elemental $Cl_2$ into one mole proportion of propargyl bromide in liquid phase at 5–55° C. and isolating 1-bromo-2,3-dichloro-2-propene as the predominant product.

References Cited in the file of this patent

UNITED STATES PATENTS

| | | |
|---|---|---|
| 2,643,272 | Lacomble et al. | June 25, 1953 |
| 2,973,393 | Monroe | Feb. 28, 1961 |

OTHER REFERENCES

Hennion et al.: J. Am. Chem. Soc. 62, 1368 (1940).
Shostakovskiy et al.: Doklady A. N. USSR 118, No. 1, 114–116 (1958).